United States Patent [19]

Zink

[11] Patent Number: 4,997,918
[45] Date of Patent: Mar. 5, 1991

[54] BENZTHIAZOLIUM AZO DYES

[75] Inventor: Rudolf Zink, Therwil, Switzerland

[73] Assignee: Ciba-Geigy Corporation, Ardsley, N.Y.

[21] Appl. No.: 47,549

[22] Filed: May 6, 1987

Related U.S. Application Data

[63] Continuation of Ser. No. 882,566, Jun. 30, 1986, abandoned, which is a continuation of Ser. No. 524,805, Aug. 19, 1983, abandoned.

[30] Foreign Application Priority Data

Aug. 30, 1982 [CH] Switzerland ............... 5141/82

[51] Int. Cl.$^5$ ............... C09B 44/10; C09B 44/20; D06P 1/08; D06P 3/76
[52] U.S. Cl. ............... 534/611; 534/622; 534/788; 534/589; 534/887
[58] Field of Search ............... 534/611, 622

[56] References Cited

U.S. PATENT DOCUMENTS

| | | | |
|---|---|---|---|
| 2,889,315 | 6/1959 | Bossard et al. | 534/622 X |
| 3,078,137 | 2/1963 | Baumann et al. | 534/622 X |
| 3,102,878 | 9/1963 | Baumann et al. | 534/622 X |
| 3,148,935 | 9/1964 | Pfitzner et al. | 534/622 X |
| 3,294,777 | 12/1966 | Hansen et al. | 534/622 X |
| 3,874,847 | 4/1975 | Ohkawa et al. | 534/622 X |
| 4,018,756 | 4/1977 | Ohkawa et al. | 534/622 X |
| 4,247,458 | 1/1981 | Shuttleworth | 534/622 X |
| 4,292,238 | 9/1981 | Kuhlthau | 534/622 X |
| 4,465,628 | 8/1984 | Grund et al. | 534/622 X |

FOREIGN PATENT DOCUMENTS

| | | | |
|---|---|---|---|
| 918645 | 1/1973 | Canada | 534/611 |
| 368283 | 7/1970 | U.S.S.R. | 534/611 |
| 1449819 | 9/1976 | United Kingdom | 260/158 |

*Primary Examiner*—Floyd D. Higel
*Attorney, Agent, or Firm*—Wenderoth, Lind & Ponack

[57] ABSTRACT

Novel cationic azo compounds of the formula

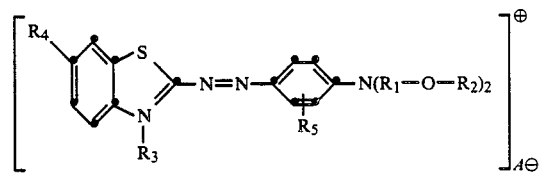

wherein $R_1$ is $C_1$–$C_4$-alkylene, $R_2$ is $C_1$–$C_4$-alkyl, $R_3$ is $C_1$–$C_4$-alkyl, $R_4$ is hydrogen, $C_1$–$C_4$-alkyl, $C_1$–$C_4$-alkoxy, acylamino or halogen, $R_5$ is hydrogen, $C_1$–$C_4$-alkyl, $C_1$–$C_4$-alkoxy or halogen, one or more or $R_5$ independently of each other being present on the ring to which $R_5$ is attached, and A is an anion. Also provided is the production, and the use of these novel compounds as dyes for dyeing and/or printing, especially polyacrylonitrile materials, neutral blue dyeings having in particular good fastness to light being obtained.

6 Claims, No Drawings

BENZTHIAZOLIUM AZO DYES

This application is a continuation of now abandoned application Ser. No. 882,566, filed June 30, 1986, which is a continuation of of now abandoned application Ser. No. 524,805, filed Aug. 19, 1983.

The invention relates to novel cationic azo compounds, to processes for producing them, and to their use as dyes for dyeing and/or printing polyacrylonitrile materials or polyamide and polyester materials modified with acid groups.

The novel cationic azo compounds correspond to the formula I

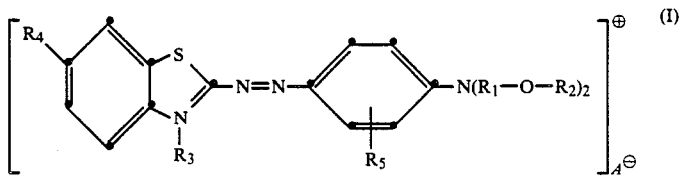

wherein
$R_1$ is a $C_1-C_4$-akylene group,
$R_2$ is a $C_1-C_4$-alkyl group,
$R_3$ is a $C_1-C_4$-alkyl group,
$R_4$ is hydrogen, a $C_1-C_4$-alkyl group, a $C_1-C_4$-alkoxy group, an acylamino group or halogen,
$R_5$ is hydrogen, a $C_1-C_4$-alkyl group, a $C_1-C_4$-alkoxy group or halogen, and the substituent $R_5$ can be present once or repeatedly (each independently of the other), and
A is an anion.

When $R_1$ is a $C_1-C_4$-alkylene group, and $R_2$, $R_3$, $R_4$ and/or $R_5$ are each a $C_1-C_4$-alkyl group, they are straight-chain or branched-chain alkyl and alkylene groups, for example the methyl, ethyl, n- and iso-propyl groups, or n-, sec- and tert-butyl groups, which in the OH, $C_1-C_4$-alkoxy, $CONH_2$, $CONH(C_1-C_4$-alkyl), $CON(C_1-C_4$-alkyl)$_2$, CN or halogen.

If $R_4$ and/or $R_5$ are each a $C_1-C_4$-alkoxy group, it is a straight-chain or branched-chain alkoxy group, such as the methoxy, ethoxy, n- or iso-propoxy group, and the n-, sec- or tert-butoxy group.

When $R_4$ is an acylamino group, it is a $C_1-C_4$-alkylcarbonylamino group (for example acetylamino) or an acylcarbonylamino group (for example a benzoylamino group).

Where $R_4$ and/or $R_5$ are each halogen, it is in particular fluorine, chlorine or bromine.

In the cationic azo compounds preferred on account of their good fastness to light, $R_1$ is the $C_2H_4$ group, $R_2$ and $R_3$ are each the $CH_3$ group, $R_4$ is a $C_1-C_4$-alkoxy group, especially the methoxy group, and $R_5$ is hydrogen.

As an anion, "A" denotes both organic and inorganic ions, for example of halogen, such as chloride, bromide or iodide, of boron tetrafluoride, rhodanide, sulfate, methyl sulfate, ethyl sulfate, aminosulfonate, perchlorate, carbonate, bicarbonate, phosphate, phosphomolybdate, phosphotungstate, phosphotungstomolybdate, benzenesulfonate, naphthalenesulfonate, 4-chlorobenzenesulfonate, oxalate, maleinate, formiate, acetate, propionate, lactate, succinate, chloroacetate, tartrate, methanesulfonate or benzoate; or complex anions, such as the anion of zinc chloride double salts.

The novel cationic azo compounds are technically readily available, and can be obtained for example by diazotising an amine of the formula II

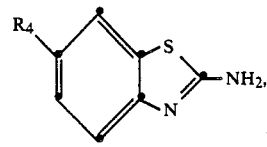

wherein $R_4$ has the stated meaning, with a coupling component of the formula III

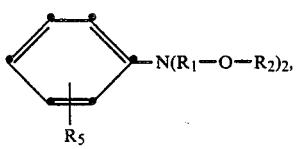

wherein $R_1$, $R_2$ and $R_5$ have the meanings defined, and quaternising the diazotised product with a compound of the formula $R_3-A$, wherein $R_3$ has the given meaning, and A is a radical convertible by the quaternising reaction into the anion $A^\ominus$.

The amines of the formula II are known (for example from the German Offenlegungsschrift No. 2,409,543), and they can be produced by known methods. The following are listed as examples:
2-amino-benzothiazole,
2-amino-6-methyl-benzothiazole,
2-amino-6-ethyl-benzothiazole,
2-amino-6-iso-propyl-benzothiazole,
2-amino-6-n-butyl-benzothiazole,
2-amino-6-methoxy-benzothiazole,
2-amino-6-ethoxy-benzothiazole,
2-amino-6n-propoxy-benzothiazole,
2-amino-6-acetylamino-benzothiazole, and
2-amino-6-chloro-benzothiazole.

Likewise known are the coupling components of the formula III (Boon, Chem. Soc. 1947, p. 311), which can be produced in a known manner. Examples which may be given are:
N,N-di-(methoxy-methyl)-aniline,
N,N-di-(ethoxy-methyl)-aniline,
N,N-di-(ethoxy-ethyl)-aniline,
N,N-di-(methoxy-ethyl)-aniline,
N,N-di-(iso-propoxy-ethyl)-aniline,
N,N-di-(n-butoxy-iso-propyl)-aniline,
2-methyl-N,N-di-(ethoxy-ethyl)-aniline,
2-ethoxy-N,N-di-(methoxy-ethyl)-aniline,
2-methoxy-N,N-di-(methoxy-ethyl)-aniline,
N,N-di-(methoxy-ethyl)-m-toluidine,
N,N-di-(methoxy-ethyl)-m-chloroaniline, and
N,N-di-(methoxy-ethyl)-p-xylidine.

The coupling reaction is performed in a known manner, for example by diazotising the amine of the formula II, and coupling the product obtained to the coupling component III, advantageously at temperatures of below 10° C., for example in glacial acetic acid.

The coupling reaction is followed by quaternising in the known manner; this can be performed for example in glacial acetic acid or in an inert solvent, such as chlorobenzene, optionally in the presence of an inorganic base, or optionally in an aqueous suspension, or without solvent in an excess of the quaternising agent at a temperature of about 20° to 120° C.

Suitable quaternising agents are for example alkyl halides, such as methyl or ethyl chloride, methyl, ethyl butyl bromide or methyl or ethyl iodide, particularly however alkyl sulfates, such as dimethyl, diethyl and dibutyl sulfate, and alkyl esters of aromatic sulfonic acids, such as methyl-p-toluene sulfonate, methylbenzene sulfonate, and also the n- and iso-propyl esters and n-, sec- and tert-butyl esters of benzenesulfonic acid; also suitable are epoxides, such as ethylene oxide, alkoxyalkyl esters of benzenesulfonic acid, acrylamide optionally substituted by alkyl, also acrylonitrile and dihaloalkylene.

After the quaternising reaction, the novel cationic azo compounds can be separated from the reaction medium and dried, or dyeing can be performed directly from the reaction solution. If desired or necessary, it is possible to exchange in these compounds of the formula I the anion "A" for another anion.

The novel cationic azo compounds of the formula I are used as dyes for dyeing and, with the addition of binders and solvents, for printing materials dyeable with cationic dyes, especially textile materials, which consist, for example, of homo- or copolymers of acrylonitrile, or synthetic polyamides or polyesters modified by acid groups. The novel cationic dyes are also suitable for dyeing wet tow, plastics materials, leather and paper. Dyeing is preferably performed in an aqueous, neutral or acid medium by the exhaust process, optionally under pressure, or by the continuous process. The textile material can be in the most varied forms: for example in the form of fibres, filaments, fabrics, knitted goods, piece goods and finished articles, such as shirts and pullovers.

It is possible by application of the dyes of the present invention to produce very brilliant, deeply coloured, neutral blue dyeings and printings which are distinguished by very good general fastness properties, such as fastness to washing and perspiration and, in particular, a good fastness to light. The novel cationic azo dyes of the formula I can moreover be very readily combined with other commercial dyes.

The term 'parts' in the following Examples denotes parts by weight, and percentages are per cent by weight.

EXAMPLE 1

13 g of 2-amino-6-methoxybenzothiazole are diazotised, in the usual manner, in nitrosylsulfuric acid, and the diazotised product is coupled to 15 g of N,N-di-methoxyethylaniline in water. By the addition dropwise of dilute sodium hydroxide solution, the dye is precipitated at a pH value of about 2, and then filtered off. The yield after drying is 38 g of a violet dye. 20 g of this are suspended in 60 ml of water at 20°-25° C. with 15.7 g of dimethyl sulfate, and the pH is kept for 6 hours at 3-4 (temperature about 30° C.) by the dropwise addition of a dilute sodium carbonate solution. The product which precipitates is filtered off, and dissolved in 800 ml of 1N acetic acid at 50° C., and the solution is filtered until clear. Sodium chloride is added to the cleared filtrate

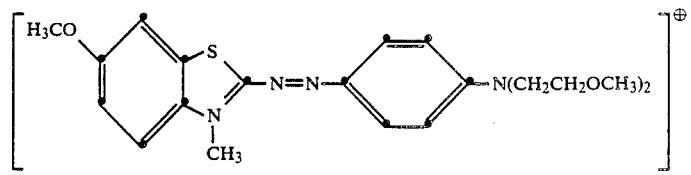

until the dye of the formula precipitates. This is filtered off and dried to leave 12 g of dry product which produces, on polyacrylonitrile, pure blue dyeings having very good fastness properties.

EXAMPLE 2

5 g of the dye produced according to Example 1 are stirred to a paste with 2 g of 40% acetic acid, and the paste is taken into solution by the addition of 4000 g of hot water. There are also added 1 g of sodium acetate and 2 g of an addition product quaternised with dimethyl sulfate and consisting of 15 to 20 equivalents of ethylene oxide with N-octadecyldiethylenetriamine; and 100 g of polyacrylonitrile fabric are introduced at 60° C. The bath is heated within 30 minutes to 100° C., and dyeing is performed at the boiling temperature for 90 minutes. The liquor is subsequently allowed to cool to 60° C. in the course of 30 minutes. The dyed material is then taken out and afterwards rinsed with lukewarm water and cold water. A pure blue polyacrylonitrile dyeing having good fastness to light is obtained.

EXAMPLE 3

A polyacrylonitrile copolymer consisting of 93% of acrylonitrile and 7% of vinyl acetate is dissolved in dimethylacetamide to form a 15% solution. The spinning solution is extruded into a spinning bath consisting of 40% of dimethylacetamide and 60% of water. The formed tow is then drawn by known methods, and is freed from dimethylacetamide by rinsing with hot and cold water.

This wet tow is dyed by immersion in a bath at 42° C. of the following composition:
 9 g of dye/litre according to Example 1,
 pH 4.5 with acetic acid.
The contact time: tow-dye liquor is 3-5 seconds. The excess dye liquor is subsequently squeezed out and the tow is transferred to the dryer. The result is a tow dyed in a blue shade and having good fastness properties.

EXAMPLE 4

A printing paste is prepared consisting of:
 25 parts of the dye obtained according to Example 1,
 30 parts of thiodiglycol, 20 parts of 80% acetic acid, 350 parts of boiling water, 500 parts of locust bean flour thickening, 30 parts of tartaric acid, 15 parts of di-(β-cyanoethyl)-formamide, and 30 parts of a naphthalenesulfonic acid/formaldehyde condensation product.

A polyacrylonitrile fabric printed with this printing paste is afterwards fixed on an HT suspension loop steamer for 20 to 30 minutes at 101° to 103° C., and subsequently finished in the customary manner. A blue printing is thus obtained.

What is claimed is:

1. A cationic azo compound of the formula

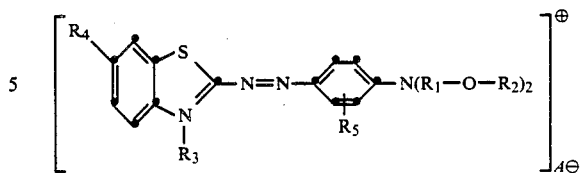

wherein
$R_1$ is $C_1$–$C_4$-alkylene,
$R_2$ is $C_1$–$C_4$-alkyl,
$R_3$ is $C_1$–$C_4$-alkyl,
$R_4$ is $C_1$–$C_4$-alkoxy,
$R_5$ is hydrogen, and
A is an anion.

2. A cationic azo compound according to claim 1, wherein $R_1$ is $C_2H_4$.

3. A cationic azo compound according to claim 1, wherein $R_2$ is $CH_3$.

4. A cationic azo compound according to claim 1, wherein $R_3$ is $CH_3$.

5. A cationic azo compound according to claim 1, wherein $R_1$ is $C_2H_4$, and $R_2$ and $R_3$ are each $CH_3$.

6. A cationic azo compound according to claim 1, wherein $R_4$ is methoxy group.

* * * * *